March 6, 1928. 1,661,847
E. N. OLSON ET AL
WINDMILL
Filed May 23, 1927 2 Sheets-Sheet 1
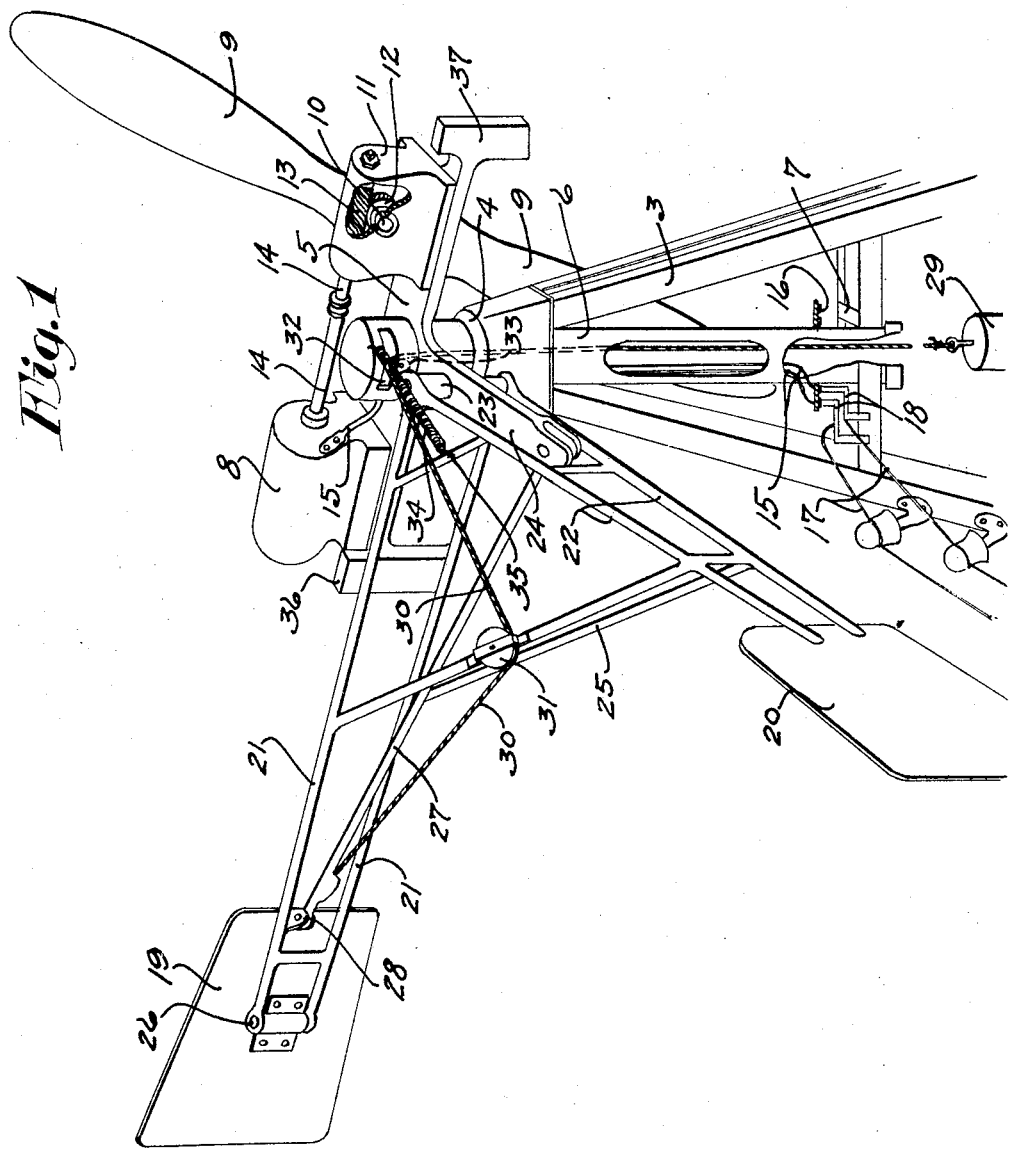
Inventor
Edwin N. Olson
Philip E. Solberg
By his Attorneys

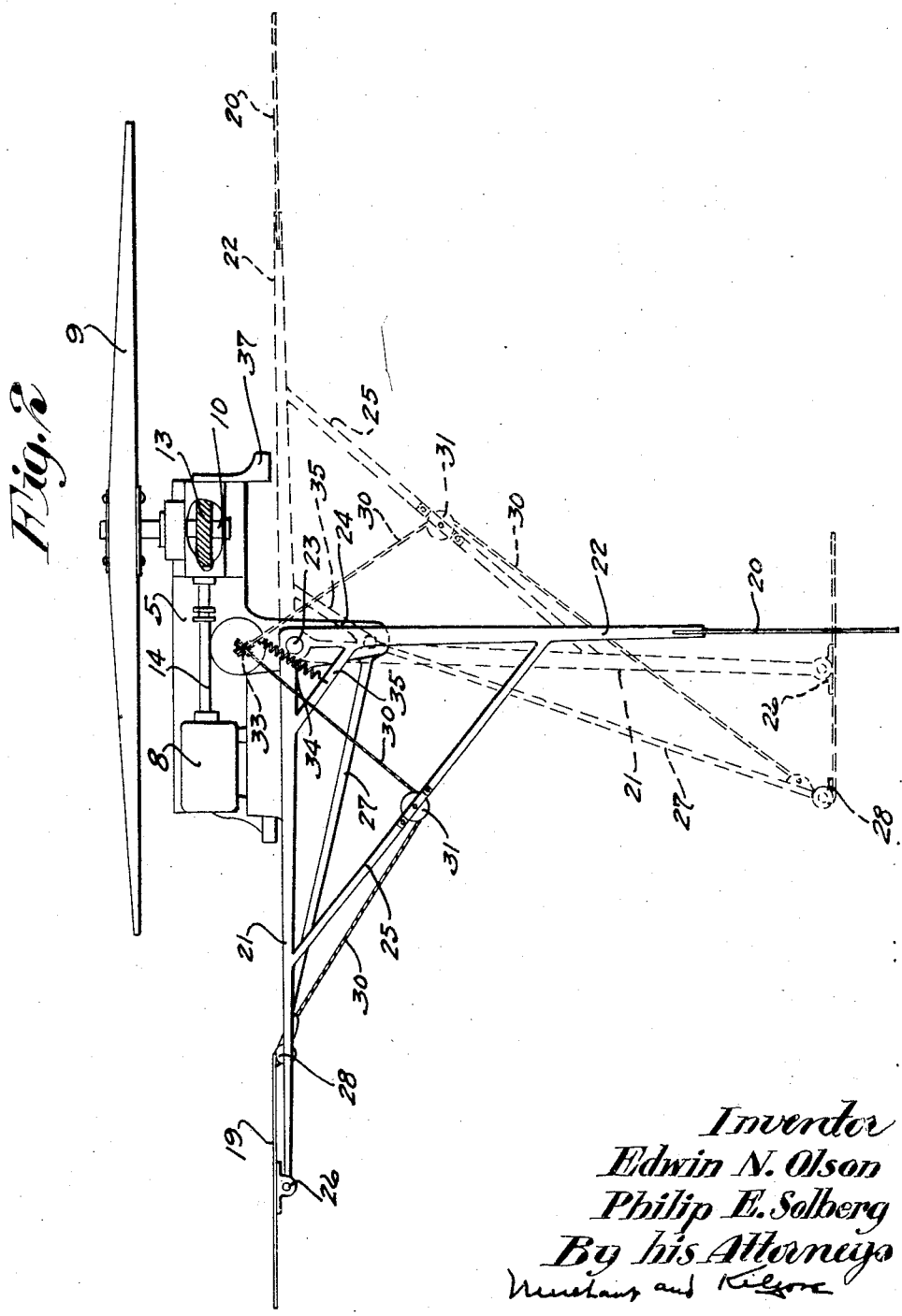

Patented Mar. 6, 1928.

1,661,847

UNITED STATES PATENT OFFICE.

EDWIN N. OLSON AND PHILIP E. SOLBERG, OF SHARON, NORTH DAKOTA.

WINDMILL.

Application filed May 28, 1927. Serial No. 195,035.

Our invention relates to windmills also known as wind motors, utilizing air currents (wind) for developing useful energy for industrial purposes to the extent of its capacity, and embodying a novel governor mechanism. The primary object of the invention is to devise a windmill that is self-regulating in the varying velocities of wind according to the demand of power required within its capacity and to effect a desired purpose.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a perspective view of the improved windmill showing its position when in the full force of the wind; and Fig. 2 is a plan view of the same and further illustrating, by means of broken lines, the inoperative position of the windmill as the same appears when stopped.

The numeral 3 indicates a tower of the type on which windmills are commonly mounted and which tower provides a support for the apparatus hereinafter referred to. This tower 3 is provided with a bearing 4 on which the windmill is mounted for self-adjustment to the wind. A main horizontal support or head 5 is mounted on the bearing 4 and provided with a depending tubular column 6 to which said head is rigidly secured. Said column 6 is mounted to freely turn in the bearing 4 and a bearing bracket 7 on the tower 3 and supports the head 5 to turn about a vertical axis.

Mounted on the head 5 is a generator 8 driven by a propeller 9 which, however, may be any commonly used wind wheel. This propeller 9 has a horizontal stub shaft 10 journaled in a gear case 11 on the head 5 diametrically opposite from the generator. Said stub shaft 10 supports the propeller 9 for rotation in a vertical plane at one side of the head 5, and has a worm gear 12 which meshes with a worm 13 on the shaft 14 of the generator 8. This shaft 14 extends longitudinally over the head 5 and radially in respect to the projected axis of the column 6 and the stub shaft 10 extends transversely of said shaft 14, and it is important to note that said stub shaft is radially spaced from the vertical axis of the head 5 and the propeller 9 axially offset from said vertical axis. Wires or other conductors 15 lead from the generator 8 through the column 6 and are attached to collector rings 16 on said column. Lead wires 17 for the transmission of power from the generator 8 are electrically connected to the ring 16 by means of brushes 18 on the bearing bracket 7.

The invention includes two vanes 19 and 20 carried by rigidly connected main and secondary horizontal swingable arms 21 and 22, respectively, in right angle arrangement and have their connected ends pivoted at 23 to a crank-acting member 24 on the head 5. It will be noted that the member 24 projects radially from the axis of the head 5 and on the opposite side of said head from the propeller 9. The arms 21 and 22, in addition to being rigidly connected at their pivot 23, are further rigidly connected by a pair of crosstie rods 25. The vane 20 is rigidly secured to the outer end of the arm 22 and the vane 19 is intermediately pivoted at 26 to the outer end of the arm 21 to turn about a vertical axis. Normally, the arm 21 extends rearward from the propeller 9 and in a plane parallel to the direction of rotation thereof, and the vane 20 and its arm 22 extend at right angles to the arm 21 and parallel to the axis of said propeller.

The pivoted vane 19 is controlled from the head 5 by a rod 27, one end of which is pivoted to a bearing 28 on said vane and the other end of which is pivoted to the outer end of the crank-acting member 24. Normally, the vane 19 is held parallel to the arm 21 by a weight 29 connected by a cable 30 to the rod 27 close to its pivot 28. This cable 30 runs over a guide sheave 31 on one of the rods 25, through a circumferentially extended slot 32 in the upper end of the column 6, over a guide sheave 33 in the column 6, downward through said column and suspends the weight 29 below said column, as shown in Fig. 1. It is important to note that the cable between the connection 28 and guide sheave moves with the arms 21 and 22 from one side to the other of a dead center in respect to the pivot 23.

A coiled spring 34 anchored to the column 6 and attached to a crosstie rod 35, connecting the arms 21 and 22, is arranged to move from one side to the other of a dead center in respect to the pivot 23. When the windmill is in an operative position, the cable 30 and spring 34 hold the arms 21 and 22, as shown in Fig. 1, in which position the arm 21 engages a stop 36 on the head 5, or when the windmill is in an inoperative position, said cable and spring yieldingly hold the arms 21 and 22 with the arm 22 in contact with a stop 37 on the head 5, as shown by broken lines in Fig. 2.

With the parts so constructed and arranged as heretofore described, the windmill will operate in the following manner:— Weight 29 being suspended by the cable 30 produces tension by which the windmill is put in an operative position, as shown in Fig. 1, and by full lines in Fig. 2. The windmill will operate in this position until the velocity of the wind increases the speed of the propeller 9 to within certain fixed limits at which time the wind pressure will force the propeller 9 to an edgewise position in the wind. This movement of the propeller 9, acting on the vane 19 through the connections 24 and 27, will operate said vane to vary the surface area thereof exposed to the wind in proportion to the position of the propeller 9, thereby keeping the balanced relation between the propeller 9 and vane 20 due to the peculiar mounting of the propeller 9 and the vane 19 in respect to the vertical axis of the head 5. It will be observed that while the surface area exposed to the wind on the propeller and the vane 19 maintain a balanced pressure to the velocity of the wind, the vane 20 maintains a position in a direct line with the wind at all times. The weight 29 raises and lowers under the action of the vane 19 with the varying velocity of wind acting on the apparatus whereby the main arms 21 and 22 move about their pivot 23 with a compensating action on the vane 19. The spring 34 is for the purpose of assisting in bringing the propeller 9 into the operative position in the full force of the wind, together with the assistance of the weight 29 acting on the vane 19. Said spring 34 also assists in holding the arms 21 and 22 in operating positions in which the arm 21 engages the stop 36, or in inoperative positions in which the arm 22 engages the stop 37.

To stop the windmill it is only necessary to release the action of the weight 29. This may be done by lifting said weight and holding the same by a suitable support or detaching the same from the cable 30. With the weight 29 in an inoperative position, the velocity of the wind will swing the arms 21 and 22 into an inoperative position, as shown by full lines in Fig. 2, and at which time the rod 27, under the action of the crank arm 24 will move the vane 19 into an inoperative position, as shown by broken lines in Fig. 2.

The word "propeller" is herein used in a broad sense to cover any kind of a wind wheel.

What we claim is:

1. In a windmill, a rotatable head, a propeller journaled on the head in a radially and axially offset position in respect to the vertical axis of the head, a yieldingly held swingable arm on the head normally extending substantially parallel to the direction of rotation of the propeller and movable into a position in which it extends substantially radially from the vertical axis of the head, a swingable vane on the arm, and connections for holding the vane substantially parallel to the direction of rotation of the propeller in all of the different positions of the swingable arm.

2. In a windmill, a rotatable head, a propeller journaled on the head, a swingable arm on the head, a swingable vane on the arm, operating connections from the head to the vane for holding said vane in substantially a constant position in respect to the direction of the rotation of the propeller during the swinging of the arm, and yielding means normally holding the vane parallel to the arm.

3. In a windmill, a rotatable head, a propeller journaled on the head, a swingable arm on the head, a swingable vane on the arm, operating connections from the head to the vane, yielding means movable with the arm from one side to the other of a dead center for holding the arm and the vane in either an operative or inoperative position.

4. In a windmill, a rotatable head, a propeller journaled on the head, a swingable arm on the head, yielding means normally holding said arm substantially parallel to the direction of rotation of the propeller, a swingable vane on the arm, yielding means normally holding the vane substantially parallel to the arm, a crank-acting member on said head, and an operating connection from said member to the vane for holding said vane in substantially a constant position in respect to the direction of the rotation of the propeller during the swinging of the arm.

5. In a windmill, a rotatable head, a propeller journaled on the head in a radially and axially offset position in respect to the vertical axis of the head, a swingable arm on the head, a swingable vane on the arm, and operating connections from the head to the vane.

6. In a windmill, a rotatable head, a propeller journaled on the head, a swingable arm on the head, said propeller and arm being on opposite sides of the axis of the head with the axis of the propeller offset forward of the pivot for the arm, a swingable vane on the arm, yielding means normally holding the arm substantially parallel to the direction of rotation of the propeller and the vane substantially parallel to the arm, and operating connection from the head to the vane for holding said vane in substantially a constant position in respect to the direction of the rotation of the propeller during the swinging of the arm.

7. In a windmill, a rotatable head, a propeller journaled on the head, main and secondary arms connected in diverging relation and pivoted to the head, a vane pivoted to the main arm, a fixed vane on the secondary arm, operating connection from the head to the movable vane, and yielding means normally holding said arms with the main arm and movable vane substantially parallel to direction of rotation of the propeller and with the secondary arm holding the fixed vane at substantially right angles to said direction.

8. In a windmill, a rotatable head, a propeller journaled on the head, main and secondary arms connected in diverging relation and pivoted to the head, said propeller and the pivot for said arms being on opposite sides of the axis of the head and with the axis of the propeller offset forward from said pivot, a vane pivoted to the main arm, a fixed vane on the secondary arm, a crank-acting member on the head, an operating connection from said member to the movable vane, a weight, a cable suspending the weight from the movable vane and normally holding said vane substantially parallel to the main arm substantially parallel to the direction of the rotation of the propeller and the secondary arm with the fixed vane substantially at right angles to said direction, an anchored spring operative on the arms, said cable and spring being movable with the arms from one side to the other of a dead center at the axis of the head and operative to hold the arms with the vanes in either an operative or inoperative position.

9. In a windmill, a rotatable head, a propeller journaled on the head in a radially and axially offset position in respect to the vertical axis of the head, yieldingly held main and secondary arms connected in diverging relation and pivoted to the head on the opposite sides of its vertical axis from the propeller, said main arm normally extending substantially parallel to the direction of rotation of the propeller and movable into a position in which it extends substantially radially from the vertical axis of the head, said secondary arm normally extending substantially radially from the vertical axis of the head and movable into a position in which it extends substantially parallel to the direction of the rotation of the propeller, a vane pivoted on the main arm, connections for holding said vane substantially parallel to the direction of rotation of the propeller in all positions of the main arm, and a fixed vane on the secondary arm.

In testimony whereof we affix our signatures.

EDWIN N. OLSON.
PHILIP E. SOLBERG.